Sept. 11, 1951 A. J. BUCK 2,567,840
ARMREST FOR AUTOMOBILES AND TRUCKS
Filed Sept. 12, 1949
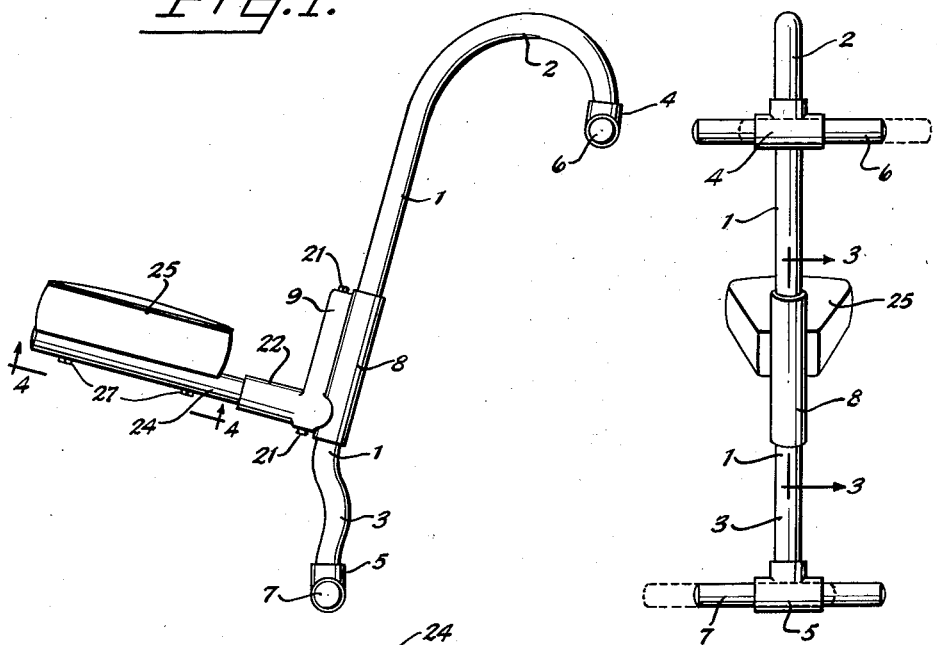
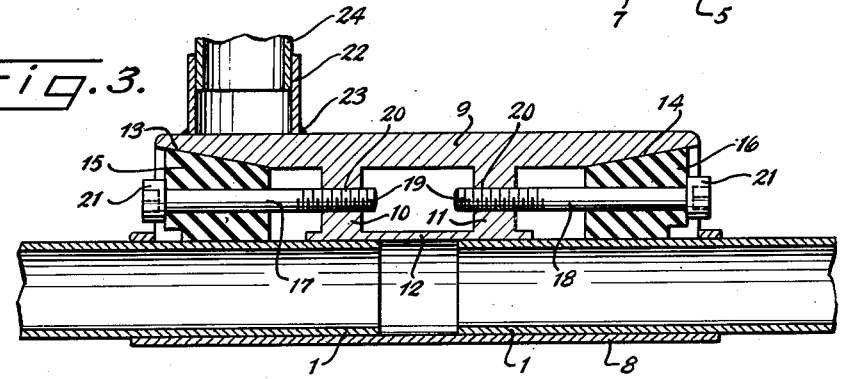
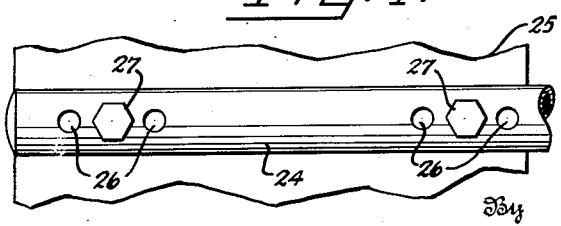
Inventor
ALVIN J. BUCK.

Patented Sept. 11, 1951

2,567,840

UNITED STATES PATENT OFFICE 2,567,840

ARMREST FOR AUTOMOBILES AND TRUCKS

Alvin J. Buck, Elkhart, Ind.

Application September 12, 1949, Serial No. 115,299

4 Claims. (Cl. 155—112)

This invention relates to arm rests for passenger automobiles and trucks.

An object of the invention is to provide an improved detachable arm rest for passenger automobiles and trucks.

Another object of the invention is to provide a detachable and adjustable arm rest for passenger automobiles and trucks.

A further object of the invention is to provide an improved adjustable arm rest for passenger automobiles and trucks which may be detachably supported upon the back of the automobile or truck seat, when in use, and which may be readily removed and stored in a lockable compartment of the automobile or truck when not in use.

A still further object of the invention is to provide an improved universal adjustable arm rest for passenger automobiles and trucks which may be positioned at either side of the automobile or truck seat back or at any desired intermediate point therebetween.

Another object of the invention is to provide an improved detachable and adjustable arm rest for passenger automobiles and trucks which will be highly efficient in operation, and relatively inexpensive to manufacture and produce.

Other objects will appear as the description of the invention proceeds.

In the accompanying drawings which form a part of this application,

Figure 1 is a side elevation of the improved arm rest and support therefor;

Figure 2 is a rear elevation of the improved arm rest and support therefor;

Figure 3 is a sectional view taken on the line 3—3 of Figure 2, and

Figure 4 is a view taken on the line 4—4 of Figure 1.

Like characters of reference are used throughout the following specification and the accompanying drawing to designate corresponding parts.

In carrying out the invention there is shown and provided an improved detachable and adjustable arm rest for passenger automobiles and trucks including a two piece tubular supporting standard generally designated by the reference numeral 1, having an end of one piece bent to form a curved attaching hook 2 which will be adapted to hook over the top of a seat back (not shown) of a passenger automobile or truck, and the other piece will have its lower end offset as at 3 in a rearward direction to underlie said hook 2, being so formed that when in operative position it will extend down between the lower portion of the seat back and the rear edge of the seat.

T-fittings 4 and 5 will be attached to the hook end 2 and to the offset lower end 3 extending in parallel relation, and will support the transversely extending cross bars 6 and 7, respectively, which are adjustable in said T-fittings so as to extend an equal distance from each side of the T-fittings, or they may be moved to extend a further distance to one or the other side of the T-fittings to lie along the front surface of the seat back, thus providing a universal support which may be disposed at either end of the seat back or at any desired position therebetween.

The two pieces of the supporting standard 1 will be adjustable towards and away from each other, the adjacent ends of said pieces being held in alignment within a tubular clamping member 8 which is provided with a parallel adjacent clamping barrel 9, provided with longitudinally spaced webs 10 and 11, which in turn are connected together by the intermediate portion 12 of the clamping member 8. As seen in Figure 3, the adjacent ends of the supporting standard 1 will be disposed within the opposite ends of the clamping member 8 in spaced relation to provide for adjusting the length of said standard.

Inwardly tapering bearing surfaces 13 and 14 will be formed in the opposite ends of the clamping barrel 9 and will coact with the inwardly sloping surfaces on the wedging blocks 15 and 16 slidably disposed in the opposite ends of the clamping barrel 9. The wedging blocks 15 and 16 will also have bearing engagement with the two pieces of the standard 1.

Bolts 17 and 18 are disposed longtiudinally through the wedging blocks 15 and 16, and will have their inner ends threaded as at 19 to extend through threaded openings 20 formed through the webs 10 and 11. The heads 21 of the bolts 17 and 18 will contact the outer ends of the wedging blocks 15 and 16, so that when the bolts are tightened or screwed inwardly, the wedging blocks 15 and 16 will wedge tightly against the sides of the adjacent ends of the two pieces of the standard 1 to hold the same in the desired adjusted position.

A supporting collar 22 is welded at 23 to the lower end of the clamping barrel 9 and extends forwardly therefrom at right angles, and adjustably supports the tube 24 upon which the padded arm rest 25 is adjustably mounted. A plurality of openings 26 are formed through the tube 24, through selected pairs of which the bolts 27 will extend with their upper ends threaded into said arm rest 25. Thus the arm rest may be adjusted forwardly or rearwardly as desired.

From the foregoing description, it will be seen that the supporting standard 1 may be adjusted to various heights of seat backs, and may be disposed at any transverse position along the length of the seat back.

While the preferred embodiment of the instant invention has been illustrated and described, it will be understood that it is not intended to limit the scope of the invention thereto, as many various changes in detail of construction may be resorted to without departure from the spirit of the invention as claimed.

Having thus described my invention, what I claim as new and desire to secure by Letters Patent of the United States is:

1. An arm rest for passenger automobiles and trucks including a two-piece supporting standard, the upper end of one piece being hooked for engaging over the top edge of a seat back, the lower end of the other piece being offset to extend between the lower end of a seat back and the rear of a seat, T-fittings on the outer ends of said pieces, laterally adjustable bracing bars supported in said T-fittings adapted to extend along the front surface of a seat back, a tubular clamping member for adjustably and telescopically supporting the adjacent inner ends of said pieces of the supporting standard, a tubular clamping barrel formed integrally with and extending parallel to said clamping member, said clamping barrel being formed with inwardly tapering surfaces in its opposite ends, tapered wedging blocks supported in said clamping barrel in contact with said tapered bearing surfaces and the adjacent ends of the pieces of the supporting standard, means for longitudinally moving said wedging blocks with respect to said clamping barrel for securing the parts of said supporting standard in the desired adjusted position, an arm rest supporting tube supported by said clamping member, and an arm rest adjustably supported on said arm rest supporting tube.

2. The subject matter as claimed in claim 1, said means for longitudinally moving the wedging blocks comprising spaced webs formed on said clamping barrel having aligned threaded openings formed therethrough, and threaded adjusting bolts extending through said wedging blocks and through said aligned threaded openings in said webs.

3. The subject matter as claimed in claim 1, said means for longitudinally moving the wedging blocks comprising spaced webs formed on the clamping barrel having aligned threaded openings formed therethrough, means connected between said webs engageable with the adjacent inner ends of the pieces of said supporting standard, and threaded adjusting bolts extending through said wedging blocks and through said aligned threaded openings in said webs.

4. The subject matter as claimed in claim 1, and a collar on said clamping member extending forwardly thereof and at right angles thereto interposed between said clamping member and said arm rest supporting tube.

ALVIN J. BUCK.

REFERENCES CITED

The following references are of record in the file of this patent:

UNITED STATES PATENTS

| Number | Name | Date |
| --- | --- | --- |
| 62,081 | Smith | Feb. 12, 1867 |
| 1,463,293 | Paddock | July 31, 1923 |
| 1,742,822 | Olson | Jan. 7, 1930 |
| 2,184,181 | Fall | Dec. 19, 1939 |